A. BARR AND W. STROUD.
LONG INSTRUMENTAL BASE SINGLE OBSERVER RANGE FINDER.
APPLICATION FILED FEB. 5, 1919.

1,320,965.

Patented Nov. 4, 1919.
3 SHEETS—SHEET 1.

Inventors.
Archibald Barr.
William Stroud.
By T. Walter Fowler
Atty.

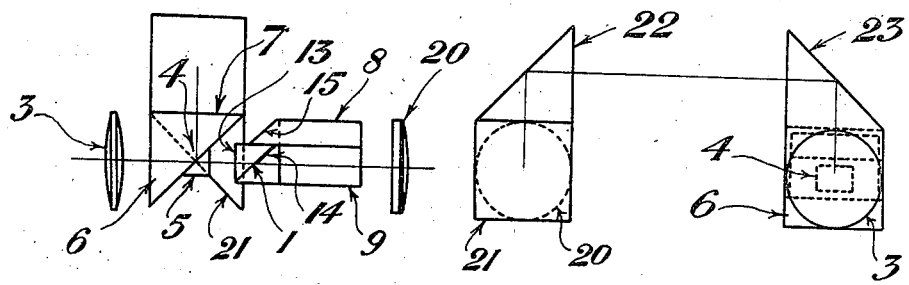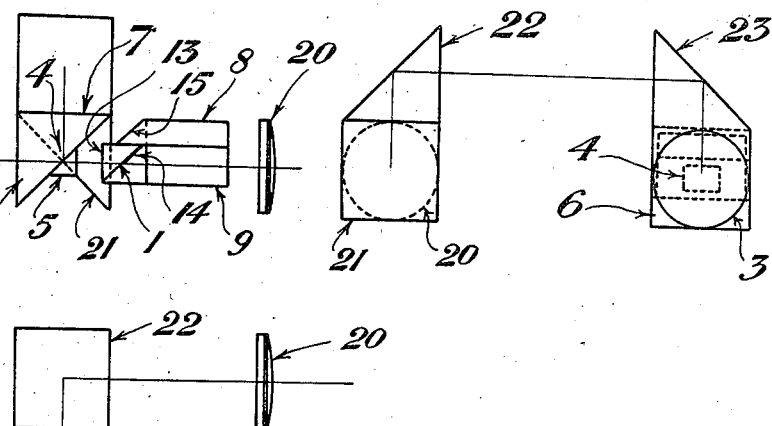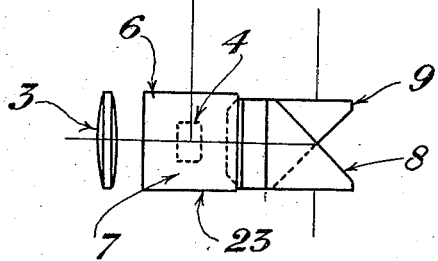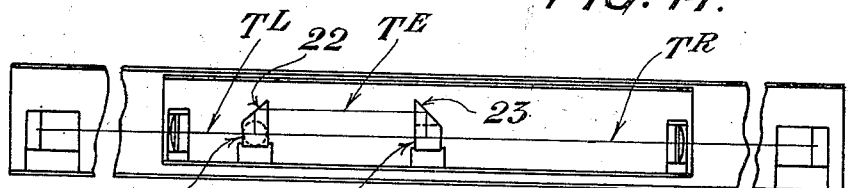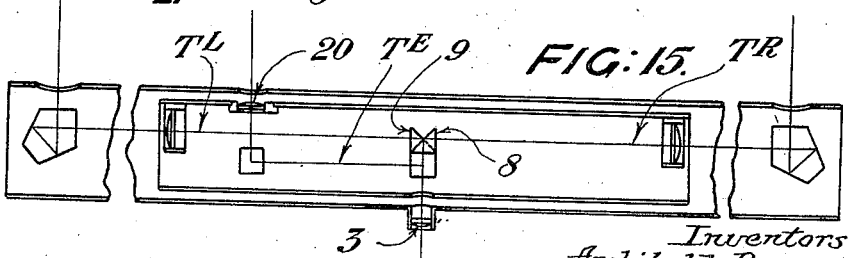

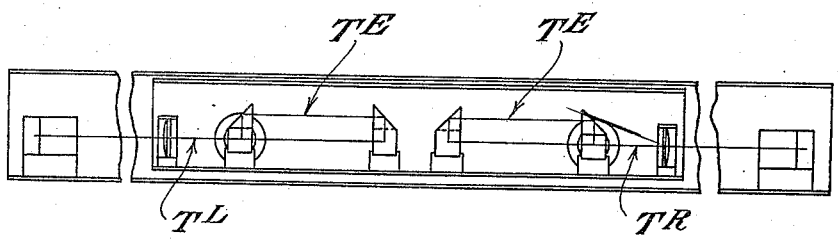
FIG:16.
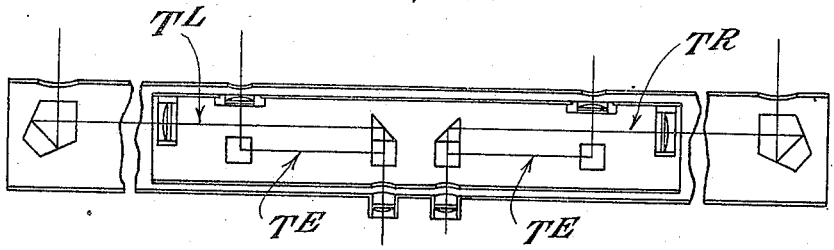
FIG:17.

UNITED STATES PATENT OFFICE.

ARCHIBALD BARR AND WILLIAM STROUD, OF ANNIESLAND, GLASGOW, SCOTLAND.

LONG-INSTRUMENTAL-BASE SINGLE-OBSERVER RANGE-FINDER.

1,320,965.  Specification of Letters Patent.  Patented Nov. 4, 1919.

Application filed February 5, 1919. Serial No. 275,116.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Long-Instrumental-Base Single-Observer Range-Finders, of which the following is a specification.

In self-contained base single observer rangefinders (working on the coincidence or stereoscopic principle) it is customary to have a double telescope supported in the interior of an outer tubular casing which carries doubly reflecting prisms or mirrors one set at each end, the frame of the double telescope being geometrically supported, that is, in such a way that it is not distorted by external forces applied to the outer casing. For various reasons it is not desirable to make this frame longer than a very few feet. If such a frame, say, 4 feet long be inserted in an outer casing, say, 30 feet long or more, the field of view with any practicable size of end-reflecting prisms or systems of reflectors is necessarily restricted. The object of our invention is to increase, if desirable, the angular size of the field of view in angle measuring instruments such as rangefinders of the general construction referred to above without impairing the angle measuring properties of the instrument and without sacrificing any of the light.

This object we accomplish in rangefinders of the coincidence type by providing an extra telescope for the eye used for rangefinding, and in those of the stereoscopic type by providing two extra telescopes, one for each eye, or an extra telescope for one of the eyes only. Thus, in coincidence instruments, we provide the eye used for rangefinding with two range-finding telescopes and one extra telescope associated with a compound eyepiece system capable of presenting to the eye three views simultaneously, just as in an ordinary coincidence rangefinder two views are presented simultaneously one from each of two rangefinder telescopes combined to form a complete field of view, and in stereoscopic rangefinders we provide one eye (or each eye) with two telescopes associated with a compound eyepiece capable of presenting simultaneously to one eye (or each eye) two views one from a rangefinding telescope the other from an extra telescope which are combined to form a complete field of views. The view presented from each of the two rangefinding telescopes according to this invention is small and arranged to constitute a portion in the central region of the field of views presented for ocular inspection and the view presented from the extra telescope or each of them is large and arranged to constitute a surrounding portion about the central region completing the field of views.

Some examples of the application of the invention to coincidence rangefinders will now be described with reference to the accompanying drawings, in which:—

Fig. 11 is a side elevation, Fig. 12 is a front view and Fig. 13 is a plan showing a compound eyepiece according to Figs. 7 and 8 associated with an extra telescope.

Fig. 14 is an elevation and Fig. 15 is a plan illustrating a rangefinder of the coincidence type with the extra telescope incorporated therein.

Fig. 16 is an elevation and Fig. 17 is a plan illustrating a rengefinder of the stereoscopic type with two extra telescopes incorporated therein.

Figure 1:
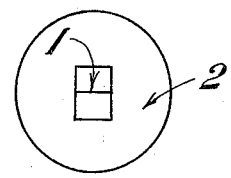
Figure 1 shows an example of the nature of a field of view obtained by this invention.

In the drawings, the two rangefinder telescopes on the right and left hand ends of the frame are designated $T^R$ and $T^L$ respectively and the extra telescope or telescopes $T^E$. As shown in Fig. 1, the small views presented one from each of the rangefinding telescopes $T^R$ and $T^L$ are placed the one over the other with a fine separating line 1 between them as in an ordinary coincidence rangefinder, and this double picture occupies a position in the central region of a field of views which is completed by a large view 2, surrounding the central region presented from an extra telescope $T^E$. While the separating line 1 between the small views furnished by $T^R$ and $T^L$ can be arranged to be in exact focus, it will not be necessary to arrange that the separating lines between the small and large views furnished by $T^R$ and $T^E$ or by $T^L$ and $T^E$ shall be in exact focus, since this is of no importance from the rangefinding point of view.

Figure 9:
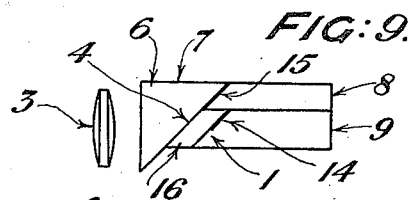
Figure 10:
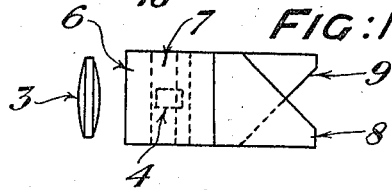

There are many ways of carrying our invention into effect, some examples of which will now be described with reference to the drawings. In the drawings, 1 represents the separating line, 3 the eyepiece lens, 6 a right-angled isosceles prism, the hypotenusal face of which is made light reflecting around a portion forming a window 4. This, for example, may be done by silvering the face and removing a portion of the silvering to form a window. Upon this window 4 is cemented a right-angled isosceles prism 5, see Figs. 5 and 7, or as in Fig. 2, the equivalent of such a prism upon one of whose faces a biprism is formed. In Figs. 9 and 10 an equivalent of prism 5 is incorporated in the eyepiece prism system.

In all cases the right-angled isosceles prism 6 is placed so that the optical axis of the lens 3 is normal to one of the right angle faces of the prism 6, and provision is made whereby the central ray forming the image furnished by the extra telescope $T^E$ strikes the other right angle face 7 of prism 6 normally so that an image is formed in the same plane as the separating line 1.

Figure 2:
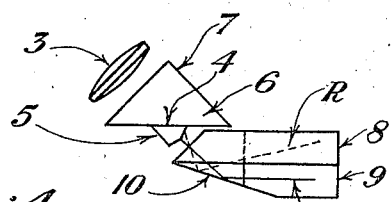
Fig. 2 is a side elevation.
Figure 4:
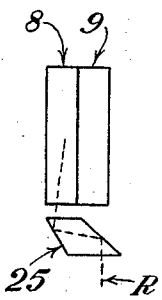
Fig. 3 is a plan and Fig. 4 is a front elevation of a compound eyepiece.
Figure 3:
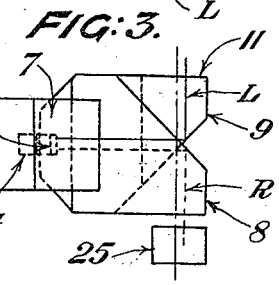

In the arrangement of eyepiece prisms shown at Figs. 2, 3 and 4, the central ray from the left hand telescope is represented by the full line L. This ray strikes the face 11 of the prism 9 normally, is reflected from the hypotenusal face, and then reflected from face 10 traversing the cemented interface between prisms 9 and 8 and then striking the lower face of the biprism 5 where it is refracted and enters the eyepiece as a central ray. The central ray from the right hand telescope, which is represented by the broken line R, strikes the prism 25, see Fig. 4, in which it undergoes double reflection so as to make its direction downward, it is then reflected from the hypotenusal face of 8 still pursuing its downward direction then, see Fig. 2, traverses the interface between prisms 8 and 9, is reflected from face 10, retraverses the said interface, strikes the upper half of biprism 5 and enters the eyepiece as a central ray. The prism 25 may be separated as shown or it may be incorporated with prism 8.

Figure 5:
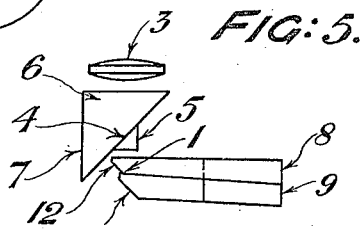
Figs. 5, 7 and 9 are side elevations.
Figure 6:
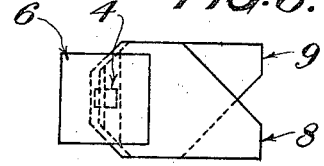
Figs. 6, 8 and 10 are plans showing respectively modified forms of compound eyepieces.

In the system illustrated at Figs. 5 and 6, the right hand central ray is reflected from the hypotenusal face of prism 8 and is then reflected from the face 12. Similarly the left hand central ray is reflected from the hypotenusal face of prism 9 and is then reflected from face 10 in a well-known manner.

Figure 7:
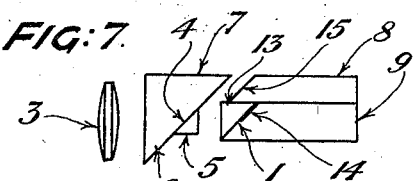
Figure 8:
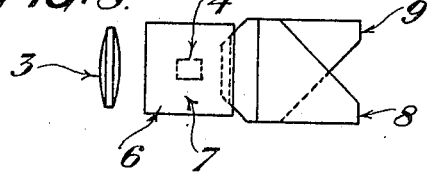

The eyepiece prism system shown at Figs. 7 and 8 is formed of three prisms 8, 9 and 13, the upper half 14 of the hypotenusal face of 13 being silvered. The right hand ray enters the eyepiece after double reflection from 15 and 14, while the left hand ray enters the eyepiece directly through the lower half of 13.

In all the cases so far dealt with the prisms 6 and 5 are shown as if supported independently of the prisms 8 and 9. In the system shown at Figs. 9 and 10, however, the equivalent of prism 5, Figs. 7 and 8, is incorporated with the eyepiece prism system in which case the whole combination would be carried on the frame-piece. The rhomboidal prism 16 now takes the place of the prisms 5 and 13, and the description of Figs. 7 and 8 will refer to this system.

In Figs. 11, 12 and 13, there is shown one form which the extra telescope $T^E$ may take comprising eyepiece prisms according to the system shown at Figs. 7 and 8. In this case the objective of the extra telescope $T^E$ is indicated by 20. The beam of light after traversing 20 enters 21, where it is reflected upward, after which it strikes 22 and is reflected horizontally until it strikes prism 23 which reflects it downward on to prism 6 which reflects it into the eyepiece lens 3. The telescope $T^E$ may, however, take other forms.

In Figs. 14 and 15 the telescope $T^E$ is shown incorporated in the frame of the double telescope of the rangefinder.

In the case of stereoscopic rangefinders, we may provide an extra telescope $T^E$ for each eye, as is illustrated in Figs. 16 and 17, or one extra telescope only for one of the two eyes. The arrangement of eyepiece prisms will correspond *mutatis mutandis* to those shown in the drawings except that for each eye only one inset small view will be required, thus in Fig. 1 the inset small view will have no separating line 1, the whole of this small view being furnished by one of the rangefinding telescopes, so that instead of having two eyepiece prisms 8 and 9, the one over the other (as, say, in Figs. 5 and 6) one will be required for each of the two telescopes as is well-known in connection with the manufacture of stereoscopic instruments. Thus, in the system shown at Figs. 2, 3 and 4, the prism 5 will be a simple right-angled prism having no edge at 1, and correspondingly in other cases the provision for forming a separating edge is omitted.

We claim:

1. A self-contained base single observer rangefinder having a double telescope system for rangefinding purposes, in combination with two extra telescope systems one for each eye, and two compound eyepiece systems into each of which rays from two telescopes are directed, one of these being a rangefinder telescope the other an extra telescope, four views being obtained two for each eye, and presented for ocular inspection simultaneously, the views presented to each eye consisting of a small view from one of the two rangefinding telescopes arranged to constitute a portion in the central region of its field of views presented for ocular inspection simultaneously and a large view presented from one of the extra telescopes arranged to constitute a surrounding portion about the central region completing the field of views, for the purposes set forth.

2. A self-contained base single observer rangefinder having a double telescope system for rangefinding purposes, in combination with an extra telescope system, and compound eyepiece system having an eyepiece lens and a right-angled isosceles prism so placed that the optical axis of the eyepiece lens is normal to one of the right angle faces of the prism, and the hypotenusal face of the prism being light reflecting around a portion forming a window, the rangefinding telescopes being arranged to direct their central rays through the window and the extra telescope to direct its marginal rays onto the light reflecting surface of the prism, for the purposes set forth.

ARCHIBALD BARR.
WILLIAM STROUD.

Copies of this patent may be obtained for five cents each, by addressing the "Commissioner of Patents Washington, D. C."